April 28, 1959  A. J. MACDONALD  2,884,321
METHOD FOR TREATING MOLTEN METAL
Original Filed Dec. 15, 1952  2 Sheets-Sheet 1

INVENTOR
Alexander J. Macdonald
BY
ATTORNEY

United States Patent Office 2,884,321
Patented Apr. 28, 1959

2,884,321

METHOD FOR TREATING MOLTEN METAL

Alexander J. Macdonald, Buffalo, N.Y., assignor to National Steel Corporation, a corporation of Delaware Continuation of application Serial No. 325,932, December 15, 1952. This application June 7, 1956, Serial No. 589,938

8 Claims. (Cl. 75—51)

This invention relates to metallurgical operations and more particularly to methods of and aparatus for desulphurization of molten iron.

It is well known that the sulphur content of molten iron such as pig iron can be eliminated or substantially decreased to a desired or non-objectional percentage by reducing the sulphur upon treating the molten pig iron with a suitable reducing agent such as comminuted anhydrous soda ash ($Na_2CO_3$).

A number of different methods and apparatus have been devised for adding powdered material to molten metal such as for treating molten pig iron for desulphurization by use of soda ash. For the most part such methods and apparatus are merely concerned with the introduction of the powdered material to the molten metal and do not attempt to increase the efficiency of the desulphurization reaction or to control the percentage of desulphurization as in the case of desulphurization of pig iron. Those prior apparatus that seek to control these factors do not constitute adequate solutions to the problems involved and are impractical as they constitute relatively complex mechanisms including moving parts necessarily positioned in high temperature zones such as screw and piston propulsion apparatus located in or adjacent the molten metal.

It is therefore an object of the present invention to provide a novel method of and apparatus for introducing and controllably adding comminuted material to molten metal.

Another object is to provide a novel method of and apparatus for desulphurization of pig iron.

Another object is to provide a novel method of and apparatus for desulphurization of pig iron by which the sulphur reducing reaction takes place at a higher efficiency than that obtainable upon practicing prior methods when employing conventional apparatus with a resulting high order of desulphurization even when employing low grades of soda ash.

Still another object of the present invention is to provide a novel method of and apparatus for desulphurization of pig iron in which an accurate ratio of soda ash and pig iron may be established and maintained in order to continuously provide the desired sulphur content in the pig iron, and so that only that quantity of soda ash required for the necessary or desired degree of desulphurization need be introduced into the pig iron.

Another object is to provide a novel method and apparatus of the above character in which the ratio of soda ash and pig iron may be readily varied to compensate for different percentages of sulphur content in the pig iron before desulphurization and to provide for production of pig iron having different percentages of sulphur content.

A still further object of the present invention is to provide an apparatus of the foregoing character not including moving parts within the proximity of the molten pig iron and which may be continually operated for long periods of time without mechanical failure or breakdown from other causes.

Other objects and features of the present invention will appear more fully below from the following detailed description considered in connection with the accompanying drawings which disclose a single embodiment of the invention. It is expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
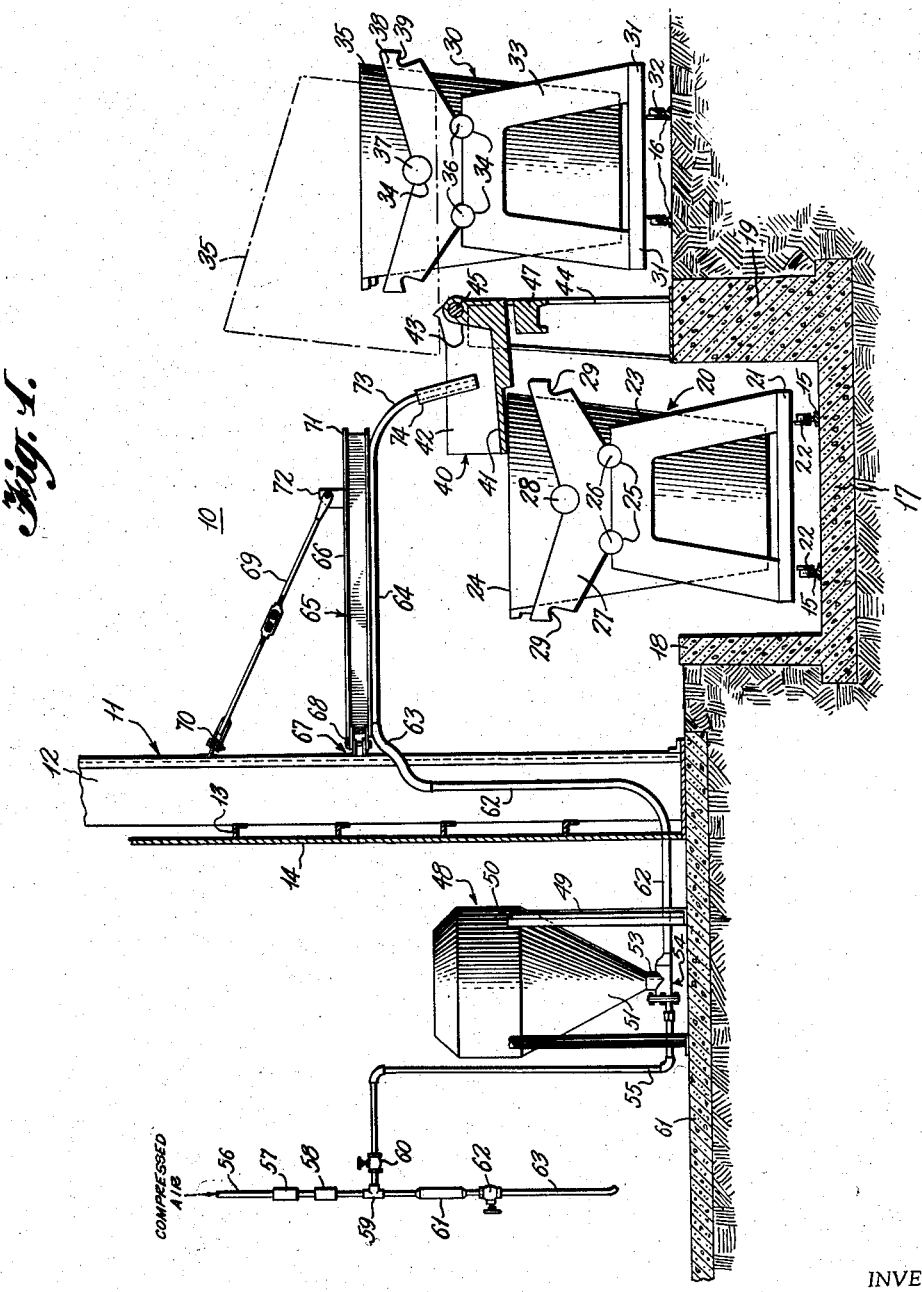
Fig. 1 is a diagrammatic presentation of a pig iron desulphurizing apparatus embodying the principles of the present invention illustrated in connection with a pig casting house.

A desulphurizing apparatus embodying the principles of the present invention is illustrated in Fig. 1 in association with a pig casting house or building designated by the reference numeral 10. While the present invention is disclosed and described as applied to desulphurization of molten pig iron and illustrated in connection with a pig casting house it is to be expressly understood that the principles of the present invention are applicable whenever it is desired to controllably add or introduce powdered material to molten metal for chemical treatment of the same, and that the particular application of desulphurization of pig iron is not limited to use in desulphurizing pig iron in a pig casting house. The casting house 10 includes side and end walls, such as the wall 11 including a plurality of spaced vertical supporting columns 12, longitudinal members 13 and siding 14, and a roof structure, not shown. Two sets of tracks 15 and 16 extend into and run longitudinally of the casting house. The tracks 15 are positioned adjacent the wall 11 and lie in a depression at an elevation substantially below the elevation of the tracks 16. A reinforced concrete supporting bed 17 may be provided to support the tracks 15. Vertical retaining walls 18 and 19 may extend longitudinally of the supporting bed to form the depression. The tracks 15 are adapted to support a ladle bearing car 20. The car 20 includes a car bed 21 supported by wheels 22 adapted to contact and roll on the tracks 15. A pair of ladle supporting columns 23 are mounted in spaced relation on the car bed 21 to support a ladle 24 therebetween. The top portion of the ladle supporting column members 23 are each provided with spaced semicircular grooves 25. Each side of the ladle 24 is provided with a pair of pins 26 adapted to enter the grooves 25 for supporting the ladle. The ladle is also provided with a pair of lifting members 27 and a pin-type lifting member 28. A crane carrying hook is designed to engage the pin lifting member 26 and lift the ladle from the car. During pouring operations notches 29 provided in the extending ends of the members 26 are utilized for pivoting the ladle about the member 27. The tracks 16 support a ladle bearing car 30. The car 30 may be similar to the ladle bearing car 20 described above including a bed portion 31 carrying wheels 32 which are adapted to ride upon the track 16. The bed portion supports a pair of spaced upwardly extending ladle supporting members 33 each of which includes a pair of spaced semicircular grooves 34. The supported ladle 35 includes a pair of pins 36 cooperating with the grooves 34 to support the ladle. For pouring operations, the ladle is provided with a hook engaging lifting pins 37, and lifting members 38 provided with notches 39.

The ladle bearing car 30 may comprise a transfer car for transporting hot metal from the blast furnace to the pig casting house. The hot metal may be transferred from the ladle 35 to the ladle 24 at a transfer station which may be conveniently located at one end of the pig casting house. The transfer station includes an iron pouring runner 40 which functions as a means for conducting the poured hot metal into the ladle 24. The iron pouring runner 40 may include a substantially rectangular cross-section transverse to the direction of iron flow formed by a substantially rectangular bottom portion 41, spaced vertically positioned side portions 42 and closed end portion 43. The iron pouring runner is mounted between a pair of spaced columns 44 and is pivotally supported on a transverse shaft 45 carried by the spaced columns. A flange 46 extending rearwardly of the end portion 43 is provided with an opening for receiving the shaft 45. A transverse member 47 may be positioned between the columns 44 beneath the runner 40 to stabilize the supporting columns.

With this arrangement, when it is desired to transfer hot metal to the pig casting house for subsequent pouring into the pig molds, the transfer car 30 is charged with molten metal from the blast furnace and is moved along the tracks 16 to the transfer station. A pouring car 20 is then moved along the tracks 15 to the position for receiving molten pig iron from the iron pouring runner 40. The ladle 35 is then lifted from the car by a crane and tilted about the pins 37, to the position shown in broken lines in the drawing, to pour the molten metal from the ladle 35 into the iron runner 40. The molten metal is transferred by the iron runner into the pouring ladle 24. When the transfer of hot metal is complete, the transfer car 30 may be returned to the blast furnace for recharging, while the casting car 20 may be moved along the tracks 15 for pouring molten pig iron from the ladle 24 into the pig molds.

As mentioned above, one of the objects of the present invention is to provide a novel method of and apparatus for controllably adding powdered material to molten metal for chemical treatment of the metal, such as a method of and apparatus for adding powdered soda ash and the like to molten pig iron for desulphurization of the pig iron with a high efficiency unobtainable from prior apparatus or methods and in a controllable manner so that the sulphur content of the pig iron may be maintained within close limits and so that only the necessary quantity of desulphurizing material is required to be added at any time during the process.

The present invention accomplishes the foregoing by forming a stream of the powdered material to be added to the molten metal, such as soda ash in the case of desulphurization of pig iron, and a stream of compressed fluid of a type that will not produce undesirable chemical reaction with the powdered material or the molten metal, such as compressed air in the case of desulphurization of pig iron. These streams are mixed together to form a motivated composite stream of powdered material and fluid with the propelling force being provided by the pressure of the fluid. The composite stream is conducted to the vicinity of the iron runner and is injected into the molten metal flowing through the runner. The composite stream may be injected onto the surface of the molten metal or into the molten metal beneath the surface of the molten metal.

As shown in the drawings, a novel apparatus provided by the present invention capable of performing the foregoing method comprises a hopper 48 for the powdered material such as powdered soda ash in the case of desulphurization of pig iron. The hopper 48 may be supported by a series of vertical columns 49 of angular cross-section. The hopper includes a cylindrical upper portion 50 and a conically shaped lower portion 51 extending from the cylindrical portion 50 and diverging downwardly toward the central vertical axis of the hopper to direct the soda ash downwardly toward a single outlet conduit 53 located at the bottom of the hopper. The conduit 53 feeds a stream of soda ash to a fluid pressure and soda ash mixing device 54. The mixing device 54 is supplied with fluid pressure by way of a conduit 55. A conduit 56 supplies a stream of fluid pressure from a source of fluid pressure, such as a source of compressed air, and conducts the stream of fluid pressure past filters 57 and 58, and through a T-connection 59 and a control valve 60 to the conduit 55. The lower side of the T-connection 59 is connected to a drip leg 61 having a control valve 62 and a drain pipe 63 in order to remove accumulated moisture from this portion of the apparatus.

The mixing device 54 functions to form a motivated composite stream of soda ash and fluid pressure in which the pressure of the fluid provides the propulsion force. Construction and operation of the mixing device will appear more fully below. A conduit 62 is connected to the discharge port of the mixing device 54 for conducting the composite stream into the casting house 10. The conduit 62 may be passed through the siding 14 of the wall 11 and may be run upwardly along a vertical supporting column 12 and supported thereon. The conduit 62 is connected by means of a flexible conduit connection 63 to a conduit 64 supported on a jib boom 65. The jib boom includes a beam member 66 joined at one end to a vertical column support 12 by means of a hinge 67 having a vertically disposed pivot member 68 for pivotally mounting the beam 66 for swinging movement in a horizontal plane. A tie bar 69 is connected to the column 12 by means of a swingable hinge 70 and to the beam member adjacent its unsupported end 71 by means of a clevis and pin connection 72. The conduit 64 extends along the beam member 66 and is supported on the beam member throughout its length. The conduit 64 terminates in an end 73 which extends outwardly and downwardly from the end 71 of the beam 66. The jib boom 65 is located at the proper elevation on the wall of the building 10 and in the vicinity of the pouring station so that, with the jib boom in its expanded position and with the iron runner 40 in an operative position as shown in Fig. 1, the end 73 of the conduit 64 is positioned to discharge or to inject the composite stream into the iron pouring runner 40. The discharge end of the conduit 64 may be provided with a nozzle 74 fabricated from any suitable material capable of withstanding the high temperatures involved, such as graphite. In some instances it may be desirable to adjust the relative position of the discharge nozzle 74 with respect to the surface of the molten metal flowing through the iron runner to direct the composite stream onto the surface of the molten metal. In other instances, it may be desirable to position the discharge nozzle 74 below the surface of the stream of molten metal to inject the composite stream into the molten metal. In the latter instances, the jib booms 65 may be made vertically adjustable in order to locate the nozzle 74 of the conduit 64 in the proper relative position with respect to the iron runner 40 for such performance. This may be accomplished by providing a universal pivotal connection between the vertical column 12 and the beam member 66 in place of the hinge 67 and its vertically disposed pivot member 68.

Figure 2:
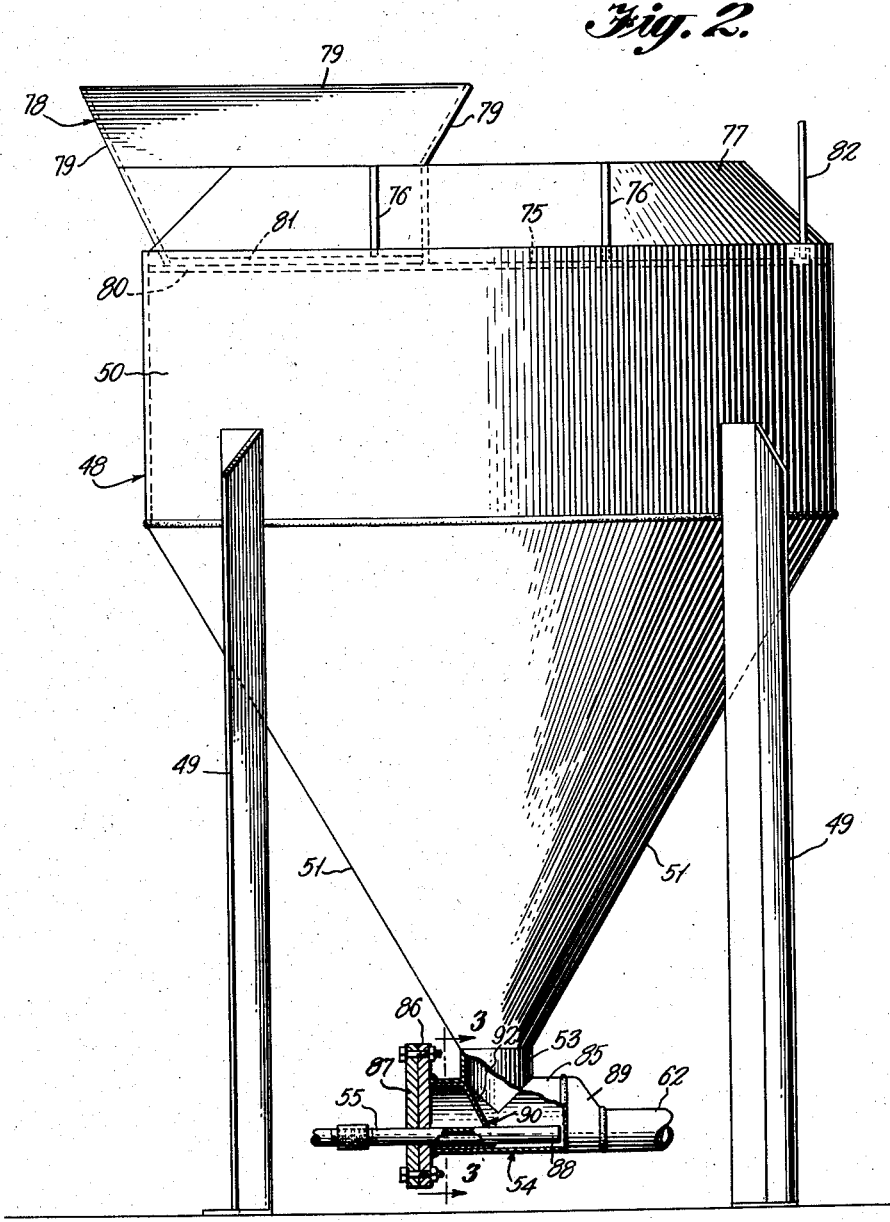
Fig. 2 is a view in side elevation and partially in section of a portion of the desulphurizing apparatus shown in Fig. 1.

As shown more clearly in Fig. 2 of the drawings, the hopper 48 is closed at its upper end by a circular disk cover member 75 which may be welded to the inside walls of the body portion 50. Pairs of spaced, vertically disposed plate members 76 and 77 extend across the cover member in quadrature relation to reinforce the cover member. The hopper may be charged with desulphurizing material through a chute arrangement 78 comprising a rectangular structure including inwardly inclined side portions 79 joined to the edges of a rectangular opening 80 in the cover member 75. The rectangular opening 80 is provided with a suitable cover 81. The cover 81 may be designed in any convenient manner to provide a tight seal closing the opening 80 to prevent the passage of fine particles therethrough. In some cases it may be desirable to establish a seal between the cover 81 and the opening 80 capable of maintaining a substantial pressure in the hopper 48. In such instances, fluid under pressure, such as compressed air, may be introduced into the top of the hopper 48 by means of a conduit 82 communicating within the hopper through an opening in the cover member 75. Pressurization of the desulphurizing material within the hopper may be used as an aid to the desulphurizing process, or it may be employed as the sole motivating source for the desulphurizing material.

Figure 3:
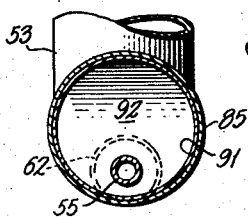
Fig. 3 is a sectional view taken along the line 3—3 of Fig. 2.

As shown more fully in Figs. 2 and 3, the mixing device 54 includes a hollow cylindrical body portion 85 having an opening at a medial point thereof joined with the outlet conduit 53 of the hopper. One end of the body portion 85 terminates in a flange 86 having a complementary flange 87 bolted to its outside surface. The flange 87 supports the fluid pressure feeding conduit 55 which passes through a suitable opening in the flange 86 and extends into the hollow cylindrical body portion 85. The fluid pressure feeding conduit 55 extends into the body portion 85 adjacent its lower side with its discharge end 88 terminated adjacent the right-hand end of the body portion, as viewed in the drawing. Preferably, the discharge end 88 should extend beyond the right-hand or discharge side of the outlet conduit 53. The right-hand end of the body portion is joined with the discharge conduit 62 through an adapter 89. The end of the body portion on the fluid pressure inlet side of the conduit 53 is provided with a baffle insert 90. The baffle insert 90 comprises a cylindrical member 91 designed to fit tightly within the body portion including a closed end portion 92 having an opening in its lower portion for the passage of the conduit 55. The end portion 92 lies in a plane extending from the extreme left-hand point of intersection between the conduit 53 and the body portion on the fluid pressure inlet side of the mixing device downwardly in the body portion at an angle inclined toward the discharge end 88 of the conduit 55. With this arrangement, the desulphurizing material moving downwardly in the conduit 53 will be directed by the inclined surface of the end plate 92 toward the right-hand end of the body portion 85. The fluid pressure emitted from the discharge end 88 of the conduit 55 provides a source of propulsion energy for propelling the desulphurizing material from the body portion into the discharge conduit 62 and on to the desulphurizing process. The inclined surface of the end plate functions to move the desulphurizing material toward the discharge end 88 and thus maintain a supply of material for forming the composite stream. The size of the body portion 88 and the conduits 55, 54 and 62, the discharge characteristics of the nozzle 88 and the pressure of the fluid supplied by the conduit 55 effect the quantity of desulphurizing material delivered through the discharge conduit 62. The pressure of the fluid supplied by the conduit 55 may be controlled by the valve 60, and this valve comprises a means for controlling the rate of flow of desulphurizing material through the discharge conduit 62. The source of fluid pressure that may be introduced into the hopper by way of the conduit 82 also effects the quantity and rate of flow of desulphurizing material in the composite stream.

The method and apparatus provided by the present invention may be used in the following manner for desulphurization of pig iron. The hopper 48 is charged with soda ash and a source of compressed air is provided. The discharge nozzle 74 is then properly positioned, by adjusting the jib boom 65 with respect to the iron runner 40. While the iron runner 40 is shown as a means for transferring molten metal during a reladling process it is expressly understood that the present invention may be employed for desulphurization of molten pig iron as it is discharged from a blast furnace by properly positioning the discharge nozzle 74 relative to an iron runner conducting molten pig iron from a blast furnace. The rate of flow of the molten iron through the runner and the sulphur content of the iron are ascertained in order to determine the rate of soda ash to be injected into the iron runner for effecting the desired degree of desulphurization. The pressure of the air applied to the mixing device 54 is regulated by adjusting the valve 60 to establish the desired quantity of soda ash introduction. It has been determined from actual operation that the air pressure may vary between 10 pounds and 30 pounds gauge depending upon the quantity of soda ash required which in turn may vary from 8½ pounds to 33 pounds per ton of iron in accordance with the sulphur content in the molten pig iron and the degree or percentage of desulphurization desired. When the valve 60 is adjusted to deliver the required rate of soda ash, the pouring operation may be commenced since the air supply is fed to the mixing device 54 which functions in a manner described above to form a composite stream containing the desired quantity of soda ash which is injected from the nozzle 74 into the molten metal flowing through the iron runner 40.

When the soda ash comes into contact with the molten iron it dissociates under the existing temperature conditions forming sodium oxide and sodium vapor both of which have a strong chemical affinity for sulphur and react with the sulphur in the molten iron reducing the sulphur and producing resulting products which collect on the surfaces of the molten metal for removal in any convenient manner. It has been determined from actual operation that the method and apparatus provided by the present invention effects desulphurization of pig iron at a higher efficiency than obtainable from prior methods in that a higher degree of sulphur reduction is obtained for a given rate of soda ash introduction even when using lower grades of soda ash. The exact explanation for the advantageous results obtained upon practicing the present invention are not known. However, it is believed that the accelerated soda ash particles leaving the discharge nozzle and injected onto or into the molten metal are impacted against the iron with such force as to be embedded into the iron with a resulting immediate and more efficient reaction. This explanation may not comprise the sole reason for the advantageous results but is probably one of the controlling factors.

It has been determined that the method and apparatus provided by the present invention is capable of accurately controlling the amount of soda ash injected from the nozzle 74 to such a high degree that the sulphur content in the molten metal may be accurately controlled and also so that only the quantity of soda ash necessary for the desired reaction is introduced into the iron runner. The latter feature is advantageous in controlling the ladle reaction which takes place when soda ash is added to molten iron and which constitutes a fire hazard when excessive quantities of soda ash are introduced.

The present invention contemplates injecting the composite stream of propulsion fluid and soda ash onto the stream of molten metal in the iron runner 40 or into the molten metal at a point in the molten metal below its surface. The latter procedure may be advantageous in certain instances especially when a high ratio of soda ash and molten metal is required since the total quantity of soda ash delivered to the discharge nozzle is forced into intimate contact with the molten metal and since the ladle reaction is further reduced. In this case the air employed would necessarily be at a higher pressure to overcome the back pressure presented by the molten metal.

While the method and apparatus provided by the present invention have been disclosed and described in connection with the desulphurization of pig iron during a reladling operation it is to be expressly understood that the teachings of the invention may be employed for desulphurizing pig iron during other operations such as in the iron runners conducting pig iron from a blast furnace as well as in practically all instances when it is desired to controllably add powdered material to molten metal. Reference therefore will be had to the appended claims for a definition of the limits of the invention.

This application is a continuation of copending application Serial Number 325,932, filed December 15, 1952, now abandoned.

What is claimed is:

1. Method of adding powdered material to molten metal for treatment of the molten metal which comprises forming a stream of powdered material, forming a stream of fluid under pressure, mixing the stream of fluid under pressure and the stream of powdered material to form a motivated composite stream of powdered material and fluid propelled by the pressure of the fluid, introducing molten metal to be treated into a trough-shaped conveying means to form a stream of molten metal, injecting powdered material into molten metal to be treated by directing the composite stream onto the stream of molten metal flowing through the conveying means, the composite stream directed onto the stream of molten metal including particles of powdered material moving at a velocity so that particles of powdered material are impinged against the molten metal with sufficient force to embed particles of powdered material in the molten metal, and conducting the stream of molten metal from the conveying means to a receiver for treated molten metal.

2. Method of controllably adding powdered material to molten metal for treatment of the molten metal which comprises forming a stream of powdered material, forming a stream of fluid under pressure, mixing the stream of fluid under pressure and the stream of powdered matermial to form a motivated composite stream of powdered material and fluid propelled by the pressure of tne fluid, introducing molten metal to be treated into a trough-shaped conveying means to form a stream of molten metal, injecting powdered material into molten metal to be treated by directing the composite stream onto the stream of molten metal flowing through the conveying means, the composite stream directed onto the stream of molten metal including particles of powdered material moving at a velocity so that particles of powered material are impinged against molten metal with sufficient force to embed particles of powdered material in the molten metal, regulating the pressure of the fluid to control the quantity of powdered material injected into the stream of molten metal, and conducting the stream of molten metal from the conveying means to a receiver for treated molten metal.

3. Method of adding powdered material to molten metal for treatment of the molten metal which comprises forming a stream of powdered material, forming a stream of fluid under pressure, mixing the stream of fluid under pressure and the stream of powdered material to form a motivated composite stream of powdered material and fluid propelled by the pressure of the fluid, conducting molten metal into a runner and from the runner into a receiving ladle, and injecting powdered material into the molten metal by directing the composite stream onto molten metal flowing through the runner, the composite stream directed onto the stream of molten metal including particles of powdered material moving at a velocity so that particles of powdered material are impinged against molten metal in the runner with sufficient force to embed particles of powdered material in the molten metal.

4. Method of controllably adding powdered material to molten metal for treatment of the molten metal which comprises forming a stream of powdered material, forming a stream of fluid under pressure, mixing the stream of fluid under pressure and the stream of powdered material to form a motivated composite stream of powdered material and fluid propelled by the pressure of the fluid, conducting molten metal into a runner and from the runner into a receiving ladle, injecting powdered material into the molten metal by directing the composite stream onto molten metal in the runner, the composite stream directed onto the molten metal in the runner including particles of powdered material moving at a velocity so that particles of powdered material are impinged against the molten metal in the runner with sufficient force to embed particles of powdered material in the molten metal, and regulating the pressure of the fluid to control the quantity of powdered material added to molten metal flowing in the runner.

5. Method of adding powdered soda ash to molten pig iron for desulphurization of the pig iron which comprises forming a stream of powdered soda ash, forming a stream of fluid under pressure, mixing the stream of soda ash and the stream of fluid under pressure to form a motivated composite stream of soda ash and fluid propelled by the pressure of the fluid, introducing molten pig iron into a trough-shaped conveying means to form a stream of molten pig iron, injecting powdered soda ash into molten pig iron by directing the composite stream onto the stream of molten pig iron flowing through the conveying means, the composite stream directed onto the stream of molten pig iron including particles of powdered soda ash moving at a velocity so that particles of soda ash are impinged against the molten pig iron with sufficient force to embed particles of soda ash in the molten pig iron, and conducting the stream of molten pig iron from the conveying means to a receiver for desulphurized pig iron.

6. Method of controllably adding powdered soda ash to molten pig iron for desulphurization of the molten pig iron which comprises forming a stream of powdered soda ash, forming a stream of air under pressure, mixing the stream of soda ash and the stream of air under pressure to form a motivated composite stream of soda ash and air propelled by the pressure of the air, introducing molten pig iron into a trough-shaped conveying means to form a stream of molten pig iron, injecting powdered soda ash into molten pig iron by directing the composite stream onto the stream of molten pig iron flowing through the conveying means, the composite stream directed onto the stream of molten pig iron including particles of powdered soda ash moving at a velocity so that particles of soda ash are impinged against the molten pig iron with sufficient force to embed particles of soda ash in the molten pig iron, regulating the pressure of the air to control the quantity of powdered soda ash added to the stream of molten pig iron, conducting the stream of molten pig iron from the conveying means to a receiver for desulphurized pig iron.

7. The method of desulphurizing pig iron which comprises forming a stream of powdered soda ash, forming a stream of compressed air, mixing the stream of soda ash and the stream of compressed air to form a motivated composite stream of soda ash and compressed air with the composite stream being propelled by the pressure of the air, conducting pig iron to be desulphurized into an iron runner and from the iron runner into a receiving ladle, and injecting powdered soda ash into molten pig iron by directing the composite stream onto molten pig iron flowing in the runner, the composite stream directed onto the molten pig iron including particles of powdered soda ash moving at a velocity so that particles of soda ash are impinged against the molten pig iron with sufficient force to embed particles of soda ash in the molten pig iron flowing in the runner.

8. The method of desulphurizing pig iron which comprises forming a stream of powdered soda ash, forming a stream of compressed air, mixing the stream of powdered soda ash and the stream of compressed air to form a motivated composite stream of soda ash and compressed air with the composite stream being propelled by the pressure of the air, conducting pig iron to be desulphurized into a runner and from the runner to a receiving ladle, injecting powdered soda ash into molten pig iron by directing the composite stream onto the stream of molten pig iron flowing in the runner, the composite stream directed onto the stream of molten pig iron including particles of powdered soda ash moving at a velocity so that particles of soda ash are impinged against the molten pig iron with sufficient force to embed particles of soda ash in the molten pig iron flowing in the runner, and regulating the pressure of the air to maintain the amount of soda ash added to the stream of pig iron in the runner substantially equal to the amount of soda ash necessary for the desired degree of desulphurization of the pig iron.

References Cited in the file of this patent

UNITED STATES PATENTS

| | | |
|---|---|---|
| 905,948 | Stromborg | Dec. 8, 1908 |
| 1,083,724 | Boggs | Jan. 6, 1914 |
| 1,590,739 | Evans | June 29, 1926 |
| 1,880,452 | Hulslander | Oct. 4, 1932 |
| 2,342,102 | Clare | Feb. 22, 1944 |
| 2,525,973 | Sundstrom et al. | Oct. 17, 1950 |
| 2,577,764 | Hulme | Dec. 11, 1951 |
| 2,609,248 | Kleiber | Sept. 2, 1952 |
| 2,692,196 | Hulme | Oct. 19, 1954 |